(12) United States Patent
Ikushima (10) Patent No.: US 9,483,040 B2
(45) Date of Patent: Nov. 1, 2016

(54) PROGRAM AND DEVICE WHICH AUTOMATICALLY GENERATE OPERATION PROGRAM

(75) Inventor: Kazumasa Ikushima, Mitaka (JP)

(73) Assignee: MUSASHI ENGINEERING, INC., Tokyo (JP)

(*) Notice: Subject to any disclaimer, the term of this patent is extended or adjusted under 35 U.S.C. 154(b) by 499 days.

(21) Appl. No.: 13/979,187

(22) PCT Filed: Jan. 30, 2012

(86) PCT No.: PCT/JP2012/051910
§ 371 (c)(1),
(2), (4) Date: Sep. 9, 2013

(87) PCT Pub. No.: WO2012/105465
PCT Pub. Date: Sep. 8, 2012

(65) Prior Publication Data
US 2013/0345836 A1 Dec. 26, 2013

(30) Foreign Application Priority Data
Jan. 31, 2011 (JP) ................................. 2011-017622

(51) Int. Cl.
*G05B 19/042* (2006.01)
*G05B 19/4093* (2006.01)

(52) U.S. Cl.
CPC ....... *G05B 19/0426* (2013.01); *G05B 19/4093* (2013.01); *G05B 2219/36251* (2013.01); *Y02P 90/265* (2015.11)

(58) Field of Classification Search
None
See application file for complete search history.

(56) References Cited

U.S. PATENT DOCUMENTS 5,511,147 A * 4/1996 Abdel-Malek ......... B25J 9/1671
700/264
6,011,629 A * 1/2000 Ootake ................ H05K 3/1216
356/400
7,177,459 B1 * 2/2007 Watanabe ............. B25J 9/1697
382/151
2003/0120391 A1 * 6/2003 Saito ..................... B25J 9/1671
700/264

(Continued)

FOREIGN PATENT DOCUMENTS

JP 04-349966 A 12/1992
JP 07-218222 A 8/1995

(Continued)

OTHER PUBLICATIONS

International Search Report for PCT/JP2012/051910, Mailing Date of Apr. 24, 2012.

*Primary Examiner* — Christopher E Everett
(74) *Attorney, Agent, or Firm* — Westerman, Hattori, Daniels & Adrian, LLP (57) ABSTRACT

An automatically generating program and device are provided which can easily and accurately create an operation program with no need of providing an image data input device. The program, causes a work head to move relative to a work object and to carry out desired work, includes the steps of displaying a reference data input window which allows input of shape data of the work object or a work region (STEP 201), taking in image data of the work object or the work region (STEP 202), compensating for distortion in the taken-in image data (STEP 203), displaying a movement path input window which allows designation of a movement path with the compensated image data displayed as a background (STEP 204), and automatically generating the operation program based on the movement path that is designated on the movement path input window (STEP 205).

20 Claims, 9 Drawing Sheets

(56) References Cited

U.S. PATENT DOCUMENTS

| | | | |
|---|---|---|---|
| 2005/0055134 A1* | 3/2005 | Okuda | G05B 19/4061 700/245 |
| 2005/0122351 A1* | 6/2005 | Yamazaki | H01L 51/0004 347/5 |
| 2005/0149231 A1* | 7/2005 | Pretlove | B25J 9/1671 700/264 |
| 2006/0039735 A1* | 2/2006 | Oh | B41J 3/28 400/320 |
| 2006/0221104 A1* | 10/2006 | Iwata | B41J 11/002 347/9 |
| 2006/0229766 A1* | 10/2006 | Setsuda | B25J 9/1697 700/245 |
| 2007/0109487 A1* | 5/2007 | Lee | G02F 1/1333 349/187 |
| 2007/0216784 A1* | 9/2007 | Yuyama | H04N 5/2628 348/239 |
| 2007/0229665 A1* | 10/2007 | Tobiason | H04N 5/3572 348/187 |
| 2007/0276539 A1* | 11/2007 | Habibi | B25J 9/1612 700/245 |
| 2011/0184544 A1 | 7/2011 | Ikushima | |

FOREIGN PATENT DOCUMENTS

| | | | | |
|---|---|---|---|---|
| JP | 08-057372 A | 3/1996 | | |
| JP | 10-052664 A | 2/1998 | | |
| JP | 11-207670 A | 8/1999 | | |
| WO | WO 2007113112 A1 * | 10/2007 | | G05B 19/418 |
| WO | 2009/031305 A1 | 3/2009 | | |

* cited by examiner

PROGRAM AND DEVICE WHICH AUTOMATICALLY GENERATE OPERATION PROGRAM

TECHNICAL FIELD

The present invention relates to a program and a device for automatically generating an operation program, which causes a work head to move relative to a work object and to carry out desired work. More particularly, the present invention relates to a program and a device for automatically generating an operation program, which causes an ejection device for ejecting a liquid material to move relative to an application object and to carry out application work.

The operation program and the automatically generating program according to the present invention are each software executable on a computer, and they can be stored in a computer-readable storage medium, such as CD-ROM or DVD.

BACKGROUND ART

There are various types of apparatuses in each of which a work head is moved relative to a work object to carry out desired work. Examples of those apparatuses include mechanical working apparatuses to carry out cutting, welding, etc., assembling apparatuses to carry out bonding, fastening of screws, etc., inspection apparatuses to observe or measure objects using a camera, a laser, etc., and an application apparatus for applying a liquid material to an object. The application apparatus is mainly constituted by an ejection device for intermittently or continuously ejecting a liquid material, which is stored in a container, by the action of air pressure or mechanical pressure, and a driving mechanism for moving the ejection device and a work object relative to each other.

In most of those apparatuses, the work is carried out in accordance with an operation program. Design information related to the work object is basically required in order to create the operation program. Here, the term "design information" implies CAD/CAM data, Gerber data, etc., which collectively include information that is related to dimensions of the work object, types of working to be carried out, and so on. On the other hand, there is also a technique of creating an operation program based on an image of an actual work object, which has been taken by a camera, without using the design information (see, for example, Patent Documents 1 and 2).

Patent Document 1 discloses a liquid application apparatus in which a syringe containing a liquid stored therein and an image capturing camera are disposed in an interlocked state, driving means is operated based on an image captured by the image capturing camera to move the image capturing camera along a liquid application path and to store an amount of operation corresponding to the movement of the image capturing camera, an amount of operation required to move the syringe along the liquid application path is calculated from a relative relationship between the image capturing camera and the syringe, the driving means is operated in accordance with the calculated amount of operation, and the liquid is ejected from the syringe, thereby applying the liquid along the liquid application path on a member as an application object.

Patent Document 2 discloses an automatic application apparatus comprising a dispenser for applying an application material, and means for capturing an image of an application object and displaying the image on a screen, wherein when an application position is designated on the screen using an input device, an ejection port of the dispenser is moved to the designated position, and when data, such as the type of application material, an application speed, and an application width, is input, control is executed by calculating respective optimum values of a moving speed of moving means and an ejection pressure of the dispenser.

The applicant has previously proposed a technique of automatically generating a movement program by inputting movement information of a working apparatus as figure information, and outputting in real time information, such as a path corresponding to the input movement information, on a screen on a character basis. Stated in another way, Patent Document 3 discloses a program and a device, the program comprising the steps of displaying a text input window which allows input of movement information of a working apparatus on a character basis, displaying a figure input window which allows input of the movement information of the working apparatus as a path on a two-dimensional plane, the path being correlated with height information, outputting in real time, as the path on the two-dimensional plane and the height information thereof, the movement information of the working apparatus, which is input through the text input window, to the figure input window, outputting in real time the movement information of the working apparatus, which is input through the figure input window, to the text input window on a character basis, displaying a 3D display screen of the path of the working apparatus, and automatically generating a movement program for the working apparatus.

DOCUMENTS OF PRIOR ART

Patent Documents

Patent Document 1: Japanese Patent Laid-Open Publication No. H4-349966
Patent Document 2: Japanese Patent Laid-Open Publication No. H10-52664
Patent Document 3: International Publication Pamphlet No. WO2009/031305

SUMMARY OF THE INVENTION

Problems to be Solved by the Invention

The application apparatuses disclosed in Patent Documents 1 and 2 have the following problems because each of those application apparatuses includes a camera that is fixed at a certain distant from an ejection port.

The application apparatus cannot perform the application work during coordinate calculation.

The size of the application apparatus is increased, control is complicated, and the number of parts is increased.

An image is inclined and an image capturing range is limited depending on arrangement of the camera.

Distortion occurs in an image due to a lens.

Regarding how to confirm the result of the created operation program, in Patent Document 1, the result of the created application path is not displayed and hence it cannot be confirmed until the created operation program is actually operated. On the other hand, Patent Document 2 can display, as the result of the created application path, a single operation line connecting a start point and an end point. However, Patent Document 2 cannot be adapted for a plurality of operation lines overlapping with each other, and the function of confirming the result of the created application path is insufficient.

In view of the above-described situations, an object of the present invention is to provide an automatically generating program and device, which can easily and accurately create an operation program with no need of providing an image data input device, such as a camera, near a work head.

Means for Solving the Problems

According to a first aspect of the present invention, there is provided a program for automatically generating an operation program, which causes a work head to move relative to a work object and to carry out desired work, the program comprising a first step of displaying a reference data input window which allows input of shape data of the work object or a work region, a second step of taking in image data of the work object or the work region, a third step of compensating for distortion in the taken-in image data, a fourth step of displaying a movement path input window which allows designation of a movement path with the compensated image data displayed as a background, and a fifth step of automatically generating the operation program based on the movement path that is designated on the movement path input window. Here, the work region includes, for example, a wiring pattern region on a substrate. The shape data includes, for example, an outer edge shape (such as a triangular, quadrangular, pentagonal, or circular shape) of the work object or the work region, dimensions of the outer edges thereof, and so on.

According to a second aspect of the present invention, in the program according to the first aspect, in the first step, the reference data input window allows input of reference coordinates of the work head. Here, the reference coordinates are preferably coordinates representing the relative positional relationship between the work head and the work object or the work region.

According to a third aspect of the present invention, in the program according to the first or second aspect, in the third step, a shape reference line having a shape, which is the same as or similar to a shape of the work object or the work region, is prepared, distortion in the image data is detected by aligning the prepared shape reference line with the work object or the work region in superimposed relation, and the distortion is compensated for based on the input shape data.

According to a fourth aspect of the present invention, in the program according to the third aspect, the work object or the work region has a rectangular shape, and the shape reference line has a square shape.

According to a fifth aspect of the present invention, in the program according to the fourth aspect, in the third step, corners of the work object or the work region are automatically detected, and the corners of the work object or the work region are automatically aligned with corresponding corners of the shape reference line in superimposed relation.

According to a sixth aspect of the present invention, in the program according to the first or second aspect, in the fourth step, the designated movement path is displayed in real time on the window in accordance with a preset width value.

According to a seventh aspect of the present invention, in the program according to the first or second aspect, in the fourth step, when an anomalous point is present in the designated movement path, the movement path is displayed in real time on the window with the anomalous point displayed in a different color.

According to an eighth aspect of the present invention, the automatically generating program according to the first or second aspect further comprises a step of taking in image data of a substrate for calibration, and compensating for aberrations of a lens based on input calibration values.

According to a ninth aspect of the present invention, there is provided an operation program creating device comprising a storage device storing the automatically generating program according to the first or second aspect, an input device, a display device, and a processor.

According to a tenth aspect of the present invention, there is provided a working apparatus comprising a work head, a holder for holding a work object, a driving mechanism for moving the work head and the holder relative to each other, a reading device, a display device, an input device, and a control unit, the working apparatus carrying out desired work while the work head is moved relative to the work object based on image data of the work object or a work region, the image data being taken in from the reading device, wherein the control unit executes a step of compensating for distortion in the image data of the work object or the work region, the image data being taken in from the reading device, based on shape data of the work object or the work region, the shape data being input through the input device, a step of displaying, on the display device, a movement path input window which allows designation of a movement path with the compensated image data displayed as a background, and a step of automatically generating an operation program based on the movement path that is designated on the movement path input window.

According to an eleventh aspect of the present invention, in the working apparatus according to the tenth aspect, the control unit automatically creates the operation program based on reference coordinates of the work head, the reference coordinates being input through the input device.

According to a twelfth aspect of the present invention, in the working apparatus according to the tenth or eleventh aspect, the control unit has a function of preparing a shape reference line having a shape, which is the same as or similar to a shape of the work object or the work region, detecting distortion in the image data by aligning the prepared shape reference line with the work object or the work region in superimposed relation, and compensating for the distortion based on the input shape data.

According to a thirteenth aspect of the present invention, in the working apparatus according to the tenth or eleventh aspect, the work object or the work region has a square shape, and the shape reference line has a square shape.

According to a fourteenth aspect of the present invention, in the working apparatus according to the thirteenth aspect, the control unit has a function of automatically detecting corners of the work object or the work region, and automatically aligning the corners of the work object or the work region with corresponding corners of the shape reference line in superimposed relation.

According to a fifteenth aspect of the present invention, in the working apparatus according to the tenth or eleventh aspect, the work head is an ejection device for ejecting a liquid material.

Advantageous Effects of the Invention

With the present invention, the operation program can be automatically, easily and accurately created based on an image, which is taken in from the outside, with no need of providing an image data input device, such as a camera, near the work head. Furthermore, the operation program can be automatically created while anomalous points, such as overlapping of plural operation lines of the work head or overlapping of the operation line and a member placed on the work object, are displayed on the screen for confirmation. Accordingly, the operation program can be created in a shorter time with higher accuracy.

BRIEF DESCRIPTION OF THE DRAWINGS

FIG. 5 is an explanatory view to explain distortion compensation procedures; specifically.

FIG. 8 is an explanatory view to explain display of a line width; specifically.

FIG. 9 is an explanatory view to explain different types of aberrations; specifically.

EMBODIMENT FOR CARRYING OUT THE INVENTION

One embodiment for carrying out the present invention will be described below, by way of example, in connection with an application apparatus (see FIG. 7) in which a liquid protective material is applied to an electronic component on a printed circuit board while a work head is moved relative to a work object. In the following description, the work head is also called an ejection device, the work object is also called a workpiece or a substrate, and an apparatus including a driving mechanism for moving the ejection device and the substrate relative to each other is also called the application apparatus in some cases.

[1] Preparation Stage

Figure 1:
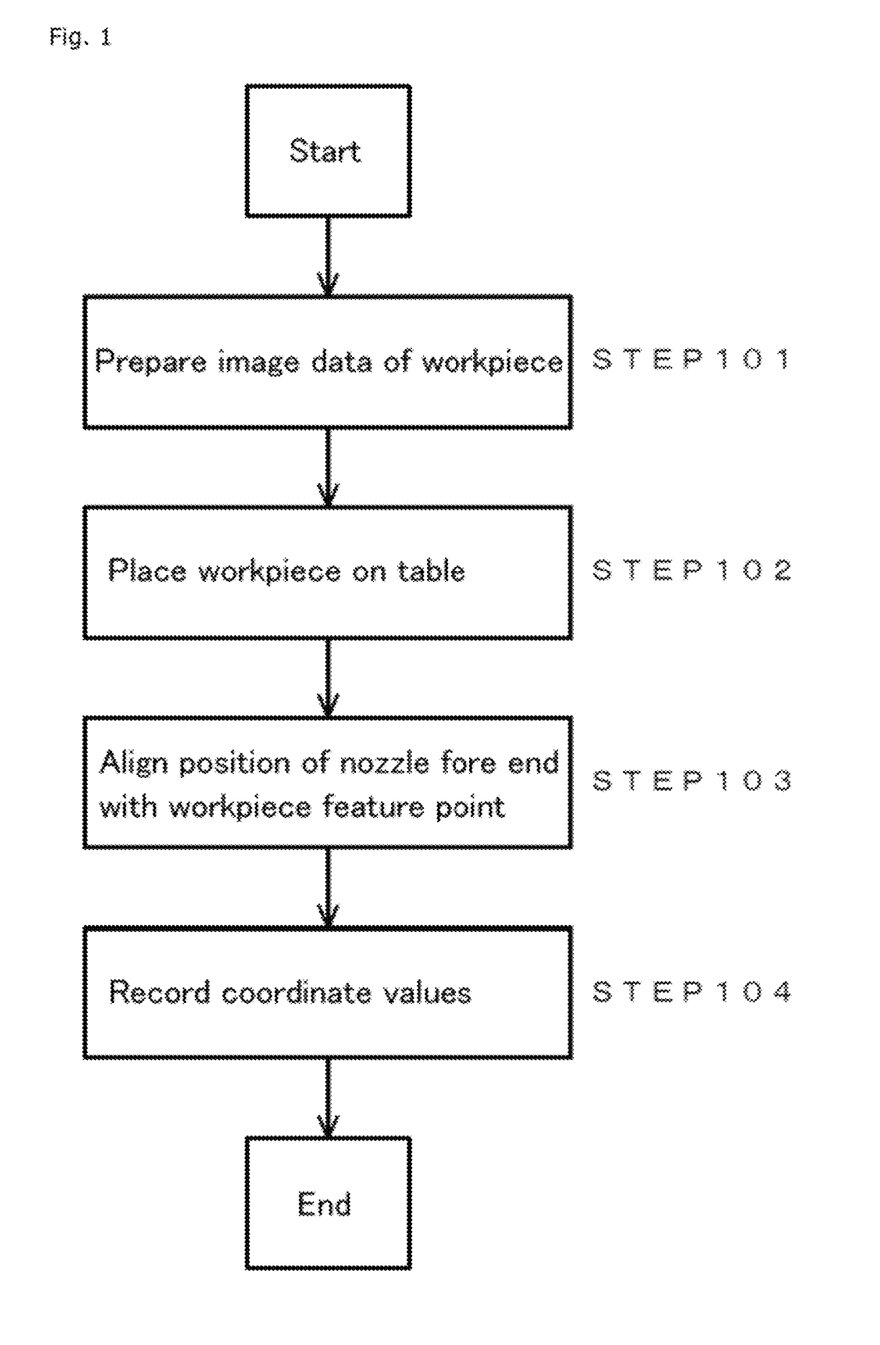
FIG. 1 is a flowchart illustrating a preparation stage.

Prior to creating an operation program, data required for creating the operation program is prepared. FIG. 1 is a flowchart illustrating procedures for the preparation. The term "operation program" implies a program, which causes the ejection device to move relative to the work object, thereby carrying out desired work, and which mainly controls a movement path and a moving speed of the ejection device, operation instructions such as ON/OFF of ejection, and so on.

(i) Preparation of Image Data

Figure 4:
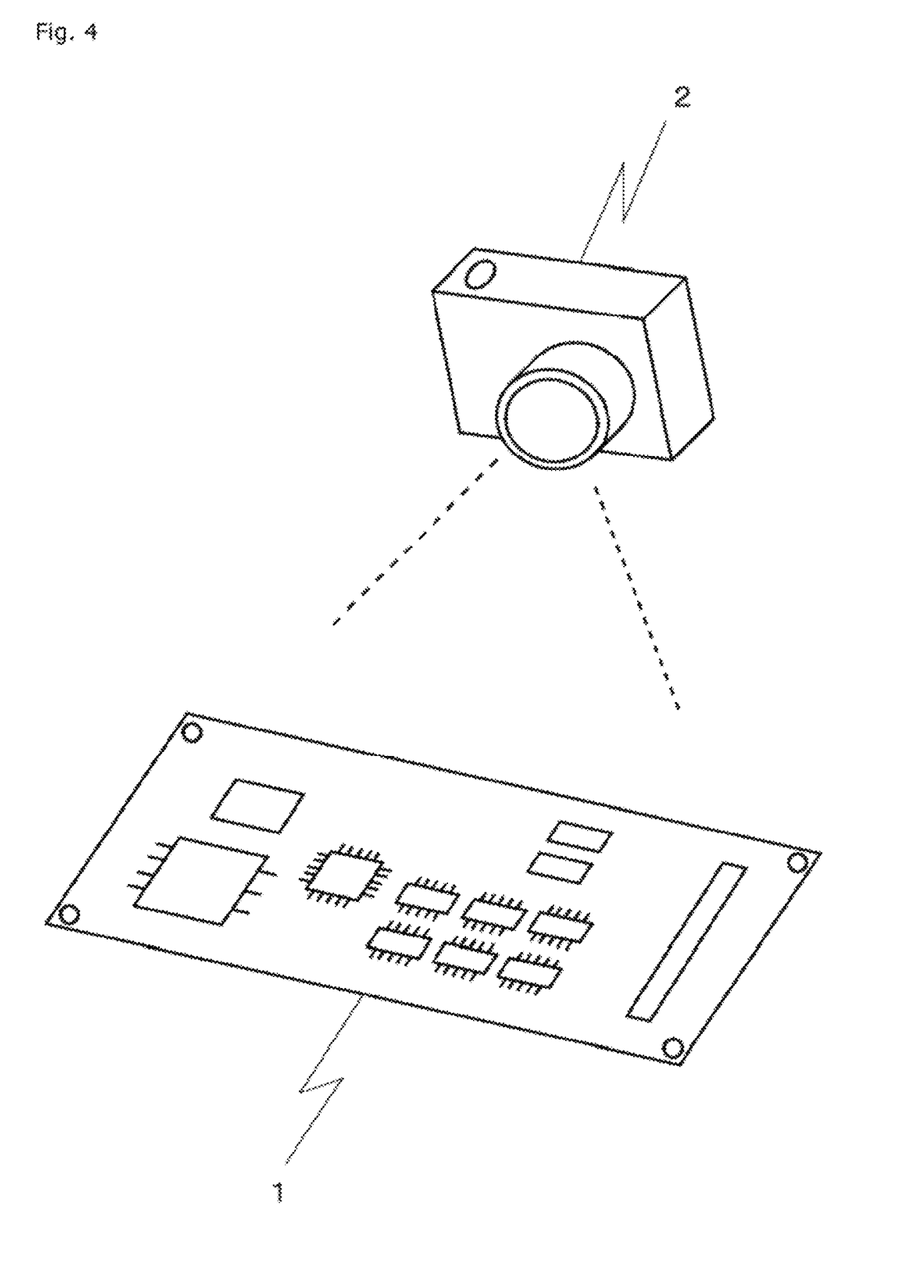
FIG. 4 is an explanatory view to explain a situation for creating image data.

At the beginning, digital data of a workpiece image (substrate image) is prepared (STEP 101). In the embodiment, an image of a working surface of the substrate 1 is captured by a digital camera 2. Alternatively, the digital data of the substrate image may be prepared by reading a printed photograph, drawing, or the like of the substrate 1 with a scanner. Because, as described later, the workpiece image is compensated prior to an operation program creation stage, the image capturing by the camera 2 is not necessarily to be made in a direction perpendicular to the working surface of the substrate. For example, as illustrated in FIG. 4, the image capturing may be performed in a composition looking down the substrate 1 from a position obliquely away above it.

Because the image capturing by the camera is not necessarily to be made in a direction perpendicular to the working surface of the substrate, even an image captured by the digital camera 2 in a state held by the hands is sufficiently usable although due care must be taken to avoid blurring or defocusing. Thus, in the present invention, a special means or structure for installing the camera in place is not needed.

(ii) Setting of Reference Coordinate Values

Next, the positional relationship between the workpiece (substrate) and the driving mechanism of the application apparatus is examined, and reference coordinate values are set.

Figure 7:
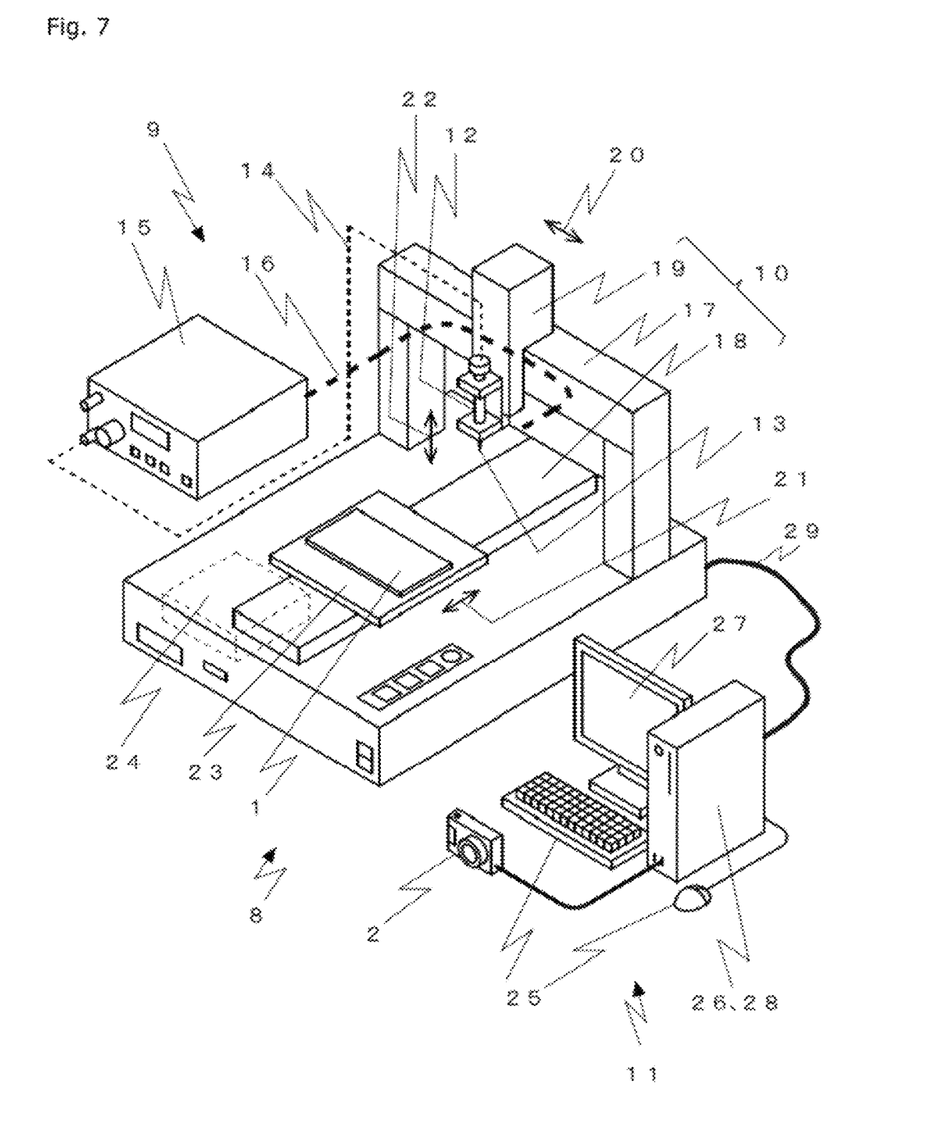
FIG. 7 is a schematic perspective view of an application apparatus according to Example.

To that end, the workpiece (substrate) 1 is placed on a table 23 to be substantially parallel to an X driving mechanism 17 (STEP 102). In the case of manually placing the substrate 1, a positioning pin is desirably disposed on the table 23 so that the substrate 1 can be placed parallel to the X driving mechanism 17 at the same position regardless of when the substrate 1 is placed by whom. A driving mechanism 10 is then manually operated to align a fore end (or a center axis) of a nozzle 13 with an application start position or a specific feature position (e.g., a corner of the substrate 1 or a terminal of the electronic component) on the substrate (STEP 103). At that time, coordinate values in the aligned state are recorded (STEP 104). The recorded coordinate values become the reference coordinate values.

[2] Operation Program Creation Stage

Figure 2:
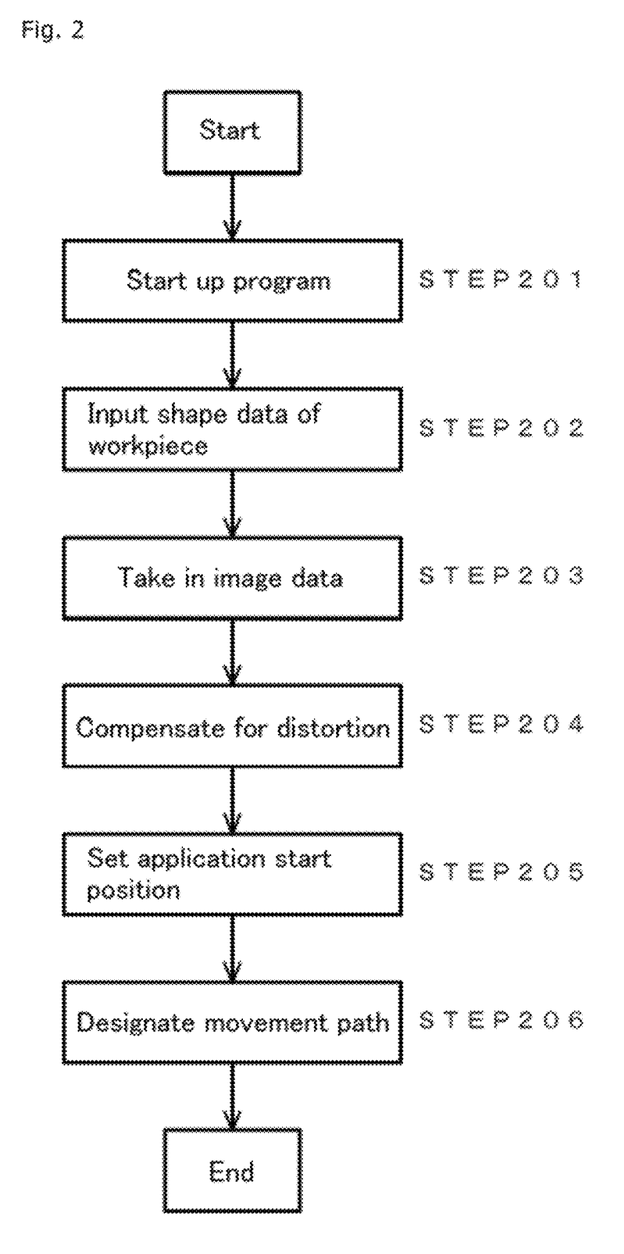
FIG. 2 is a flowchart illustrating an operation program creation stage.

After the preparations of the necessary data have finished, the operation program is created using an automatically generating program. FIG. 2 is a flowchart illustrating procedures for generating the operation program. The automatically generating program according to the embodiment is executed on an operation program creating device 11, which is separate from an application apparatus 8 and which includes an input device 25, a processor 28, a storage device 26, and a display device 27. A commercially available personal computer can be used as the operation program creating device 11.

(i) Make Image Data Correspondent to Actual Workpiece

The image data is made correspondent to the actual workpiece mainly with regards to size, and distortion of the image is compensated for through the following procedures.

Figure 5A:
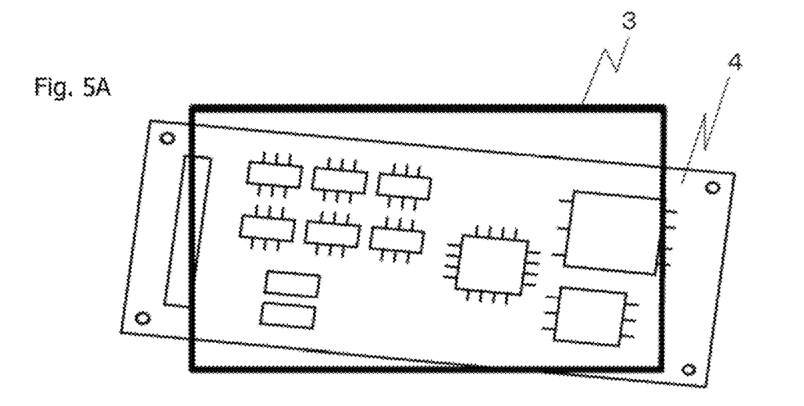
FIG. 5(a) illustrates the state before compensation.
Figure 5B:
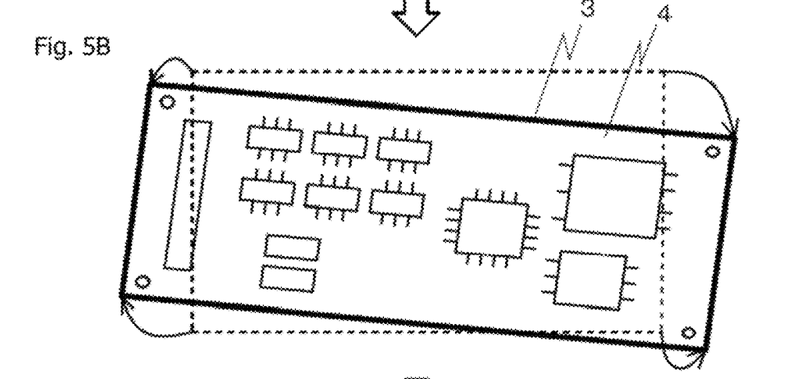
FIG. 5(b) illustrates the state where a frame line is aligned in superimposed relation.

First, the automatically generating program according to the present invention is started up (STEP 201). Next, external dimensions are input as shape data of the workpiece (substrate) 1 (STEP 202). Next, the image data of the substrate 1, which has been prepared in above [1](i), is taken in (STEP 203). Next, distortion in the image data taken in STEP 203 is compensated for (STEP 204). In more detail, the compensation is executed as illustrated in FIG. 5. A square shape reference line (frame line) 3 is displayed on a screen as illustrated in FIG. 5(a), and it is deformed in conformity with an external shape of a substrate image 4 as illustrated in FIG. 5(b). Here, the shape reference line can be displayed as any desired type of line, e.g., a dotted line, a solid line, or a double line, and the line may be displayed in any desired color. Furthermore, the size of the shape reference line can be optionally set, and the aspect ratio thereof may be different from that of the work object or region. In addition, the shape reference line may have a shape not defined by a continuous line and may be composed of, e.g., four L-shaped lines representing corners.

Figure 5C:
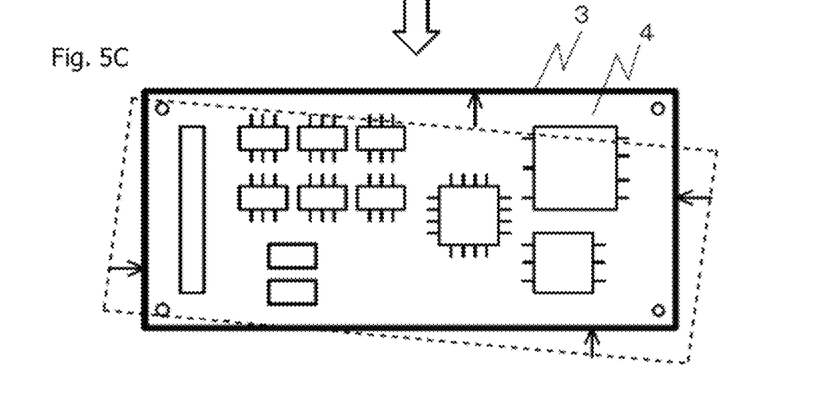
FIG. 5(c) illustrates the state after the compensation.

In the embodiment, the frame line 3 is manually deformed by dragging and dropping four corners of the frame 3 with a pointing device. As an alternative, the deformation of the frame line 3 may be automated. In other words, the substrate image 4 may be subjected to image processing to detect four corners, and the four corners of the frame line 3 may be automatically aligned with the four corners of the substrate image 4 in superimposed relation. Subsequently, compensation is executed. In more detail, as illustrated in FIG. 5(*c*), the substrate image 4 is corrected to a square shape free from distortion by rearranging individual pixels of the substrate image 4, which is designated by the frame line 3, through coordinate transform using general geometrical transform techniques, e.g., parallel translation, rotation, and scaling-up and down (extension and contraction), such that the frame line 3 has a square shape in conformity with the external dimensions input in STEP 202. Finally, an application start position (or a feature position) is set (STEP 205). In more detail, the position where the nozzle 13 has been aligned in above [1](ii) (i.e., the application start position or the feature position) is designated on the corrected image 4 displayed on the screen, and the coordinate values, which have also been recorded in above [1](ii), are input.

As described above, since the distortion of the taken-in image data is compensated for to make the image data correspondent to the actual size, data of the movement path can be easily created just by designating points with the pointing device without inputting numerical values.

(ii) Creation of Operation Program

Figure 6:
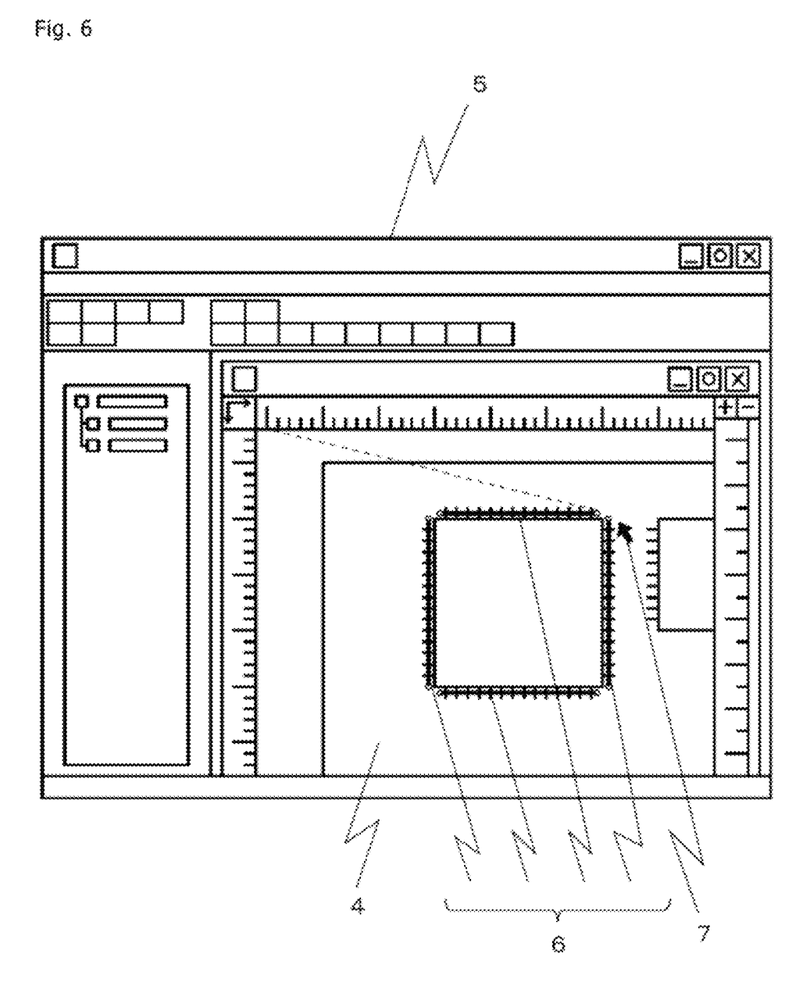
FIG. 6 is an explanatory view to explain a situation for creating the operation program.

As illustrated in FIG. 6, the image 4 in which the distortion has been compensated for in above [2](i) is displayed in a window frame (i.e., a movement path input window) that is output to a screen 5. In a state where the image 4 is displayed as a background, a nozzle movement path 6 is designated on the window frame by employing a pointing device, e.g., a mouse, (denoted by a cursor 7 on the screen) (STEP 206). With the automatically generating program according to the present invention, when the movement path 6 is designated, it is automatically converted to instruction groups for the application apparatus. In conjunction with the designation of the movement path 6, text information representing the instruction groups may be displayed in real time. For the movement path of which coordinate values are known, text input (i.e., input on a character basis) may be performed in a combined manner. In such a case, preferably, information of the movement path 6 corresponding to the text input is displayed on the screen 5 in real time.

Information input by a user includes not only a start point, an end point, and passage points of the movement path 6, but also the operation instructions such as ON/OFF of ejection, the moving speed of the ejection device, etc. in the course of the path.

The operation program is automatically created based on the coordinates of the movement path, the operation instructions, the moving speed, and so on, which have been input in the above-described procedures.

As described above, since the actual substrate image 4 is displayed as the background on the screen, it is easier to carry out the work of creating the operation program while correcting the same. Moreover, since the actual substrate image 4 is displayed as the background on the screen, the user can visually recognize a work prohibited region, interference between the movement path 6 and a component, etc. Accordingly, an accident can be avoided.

[3] Actual Work Stage

Figure 3:
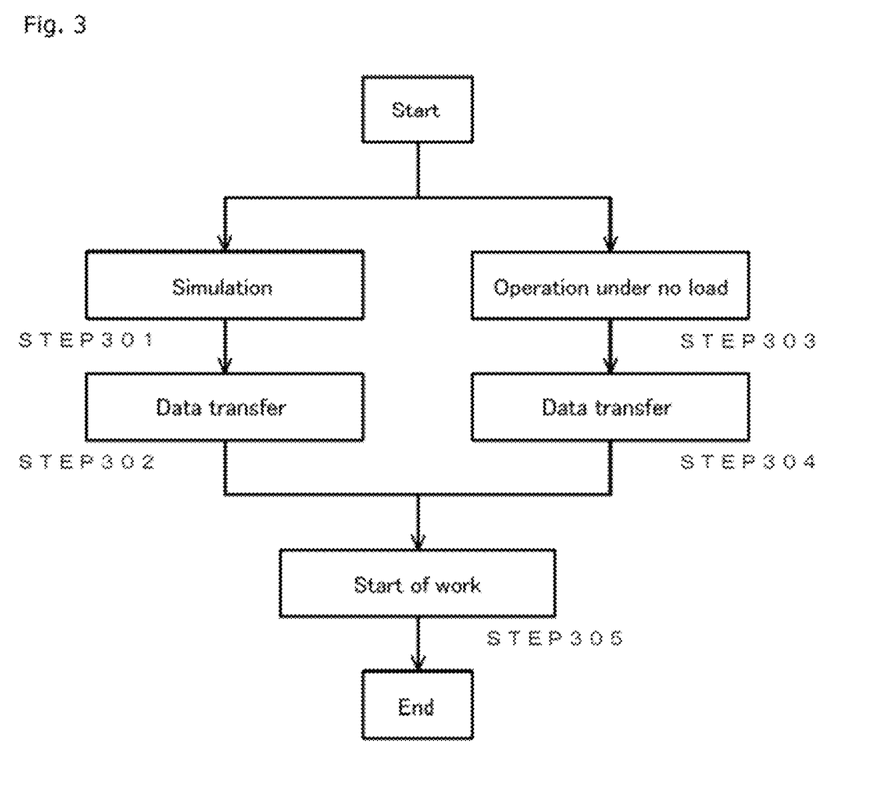
FIG. 3 is a flowchart illustrating an actual working stage.

After the completion of the operation program, the application apparatus is actually operated. Two types of procedures will be described below. FIG. 3 is a flowchart illustrating those procedures.

(i) Procedure A

First, the automatically generating program is started up, and a simulation is executed on the screen 5 to confirm the operation (STEP 301). If any error is found here, the process is returned to above [2](ii) to correct the input information of the movement path, and so on. After the completion of such an operation confirmation test on the operation program, data of the automatically created operation program is transferred to the application apparatus 8 (STEP 302). Actual work is then started (STEP 305).

With the procedure A, since the application operation can be confirmed on the same screen as an execution screen for the automatically generating program, the operation program can be easily and accurately corrected.

(ii) Procedure B

First, data of the operation program is transferred to the application apparatus 8 (STEP 303). Next, the application apparatus 8 is operated under no load without ejecting a liquid material to confirm the operation (STEP 304). If any error is found here, the process is returned to above [2](ii) to correct the operation program. The data of the operation program is transferred again to the application apparatus 8, and actual work is started (STEP 305).

The procedure B is advantageous in that, since the user can see the actually operated state of the application apparatus 8, it is easier for the user to image the actual application work. As a matter of course, the operation confirmation test may be performed in combination of both the procedures A and B.

According to the present invention, as described above, design information is not needed. In addition, since the operation program is created based on the separately prepared image data, a camera is no longer required to be disposed on a work head of a working apparatus as a result of employing the separately prepared image data. Therefore, image data captured using a commercially available digital camera, for example, is also sufficiently usable. Moreover, since digital data is just necessary, a printed photograph or figure may be read using, e.g., a scanner.

Since the camera or the like is not disposed on the working apparatus, it is no longer required to employ the working apparatus in creating the operation program. As a result, the working apparatus can be used for other work while the operation program is created.

Furthermore, according to the present invention, since the taken-in image is compensated before creating the operation program, even an inclined image can also be used. The present invention is sufficiently adaptable even for an image that is captured, for example, by a camera held with the hands. Stated in another way, a special means for installing the camera in place is not needed, whereby time and labor necessary for design and setup work can be reduced.

The present invention can be applied to not only a square-shaped workpiece, but also to a circular substrate such as a silicon wafer, or a polygonal substrate. When the shape of the workpiece is complicated or when the workpiece has recesses and/or projections along its outer edges, the deformation of the frame line 3 is preferably performed in a manual manner (or in combination with an automatic manner, as described in above [2](i)). Additionally, the compensation of the distortion in the image data may be performed based on not only the outer edges of the workpiece, but also the shape of a work object region (e.g., a wiring pattern region) that is formed on the workpiece.

Details of the present invention will be described below in connection with Example, but the present invention is in no way limited by the following Example.

EXAMPLE

Application Apparatus

A working apparatus described in this Example is an application apparatus in which application work is carried out by moving an ejection device for ejecting a liquid material relative to an application object.

As illustrated in FIG. 7, an application apparatus 8 is mainly constituted by an ejection device 9 and a driving mechanism 10. The application apparatus 8 is connected to an operation program creating device 11. The operation program creating device 11 takes in image data from an image data input device 2. Furthermore, the program for automatically generating the operation program is executed in the operation program creating device 11.

The ejection device 9 includes a reservoir 12 for storing a liquid material, a nozzle 13 attached to one end of the reservoir 12 and having an ejection port through which the liquid material in the reservoir 12 is expelled, and a dispensing controller 15 for supplying compressed gas to the reservoir 12 under a desired pressure for a desired time through a tube 14. The dispensing controller 15 is connected to the driving mechanism 10 via a communication cable 16 for receiving a signal from the driving mechanism 10 in accordance with the operation program therethrough. While a pneumatic ejection device is employed, for instance, in this Example, the type of the ejection device is not limited to the pneumatic type. Other usable ejection devices are, e.g., of the jet type in which a valve member is impinged against a valve seat, thereby causing the liquid material to fly to be ejected from a nozzle fore end, the plunger jet type in which a plunger in the plunger type device is moved and then abruptly stopped, thereby similarly causing the liquid material to fly to be ejected from a nozzle fore end, the continuous jet type, and the on-demand ink jet type.

The driving mechanism 10 is constituted by an X driving mechanism 17 capable of moving in a direction denoted by a symbol 20, a Y driving mechanism 18 capable of moving in a direction denoted by a symbol 21, and a Z driving mechanism 19 capable of moving in a direction denoted by a symbol 22. The driving mechanism 10 includes a robot controller 24 for controlling operations of those driving mechanisms, the robot controller 24 being installed within a casing. The reservoir 12 and the nozzle 13 of the ejection device 9 are supported by a holder disposed on the Z driving mechanism 19, and the Z driving mechanism 19 is disposed on the X driving mechanism 17. A table 23 on which a substrate 1 is placed and fixed is disposed on the Y driving mechanism 18. With such an arrangement, the ejection device 9 can be moved in XYZ directions (denoted by 20, 21 and 22) relative to the substrate 1.

The operation program creating device 11 is constituted by an input device 25 including a keyboard through which numerical values, etc. are input, and a mouse for designating, e.g., a movement path on a screen, a storage device 26 for storing the operation program, the image data, etc., a display device 27 for displaying the taken-in image 4, the created movement path 6, etc., on the screen, and a processor 28. In consideration of the size of the application apparatus, it is preferable that the operation program creating device 11 is separately disposed using, e.g., a commercially available personal computer. However, the operation program creating device 11 may be integrated with the application apparatus 8. In such a case, the operation program creating device 11 is constituted such that the creation of the operation program can be performed in parallel to the application work. The operation program creating device 11 is connected to the application apparatus 8 via a transfer cable 29 through which the operation program is transferred.

The image data input device 2 is constituted using, e.g., a digital camera for capturing the substrate image 4, or a scanner for reading a printed photograph or drawing of the substrate 1. The digital camera is employed in this Example. As described above, since the image is compensated before creating the operation program, it is no longer required to take care of, e.g., the orientation and the inclination of the image. Thus, the image may be captured by the camera held in the hand-held state.

The operation program is automatically created from the substrate image 4, the reference coordinate values, and so on by employing the various devices described above, and application work is then carried out. Procedures for creating the operation program are the same as those described in above [2] regarding the embodiment, and hence description of those procedures is omitted here.

According to the above-described application apparatus of this Example, the operation program can be automatically, easily and accurately created based on the image taken in from the outside with no need of providing the image data input device, e.g., the camera, near the ejection device.

Other Functions

The automatically generating program of this Example has the following functions of supporting the creation of the operation program.

(i) Highlighted Display of Movement Path

Figure 8A:
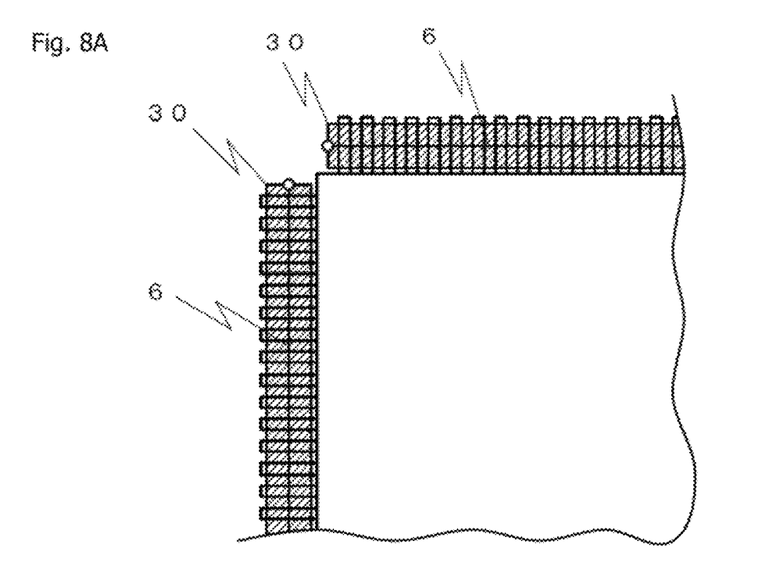
FIG. 8(a) illustrates the case not including an overlap.

The automatically generating program of this Example has the function of displaying the movement path in a highlighted state when the operation program is created as described in above [2](ii) regarding the embodiment (see FIG. 8).

First, the size of the line width is input using an input device, e.g., a keyboard. The movement path 6 is then displayed on the screen with the line width of the input size (as denoted by a symbol 30 in FIG. 8(a)).

Figure 8B:
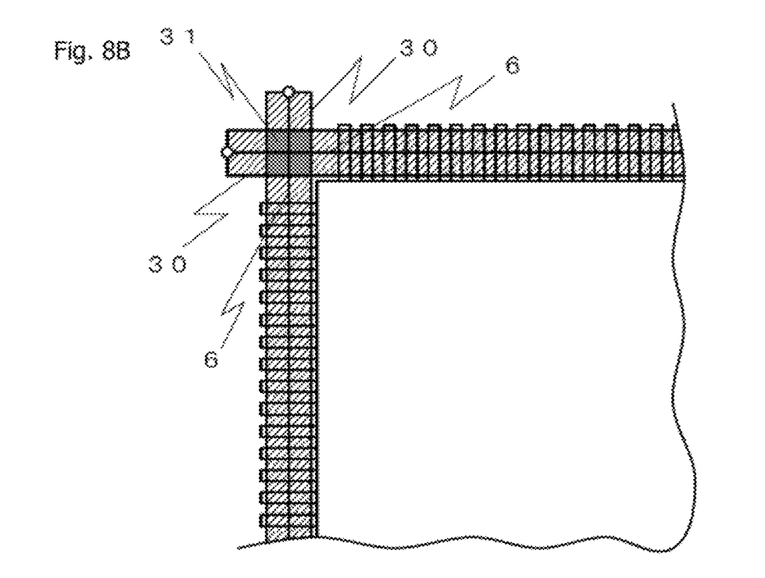
FIG. 8(b) illustrates the case including an overlap.

When a plurality of movement paths are overlapped with each other, an overlapped region is displayed in a preset different color (as denoted by a symbol 31 in FIG. 8(b)). This Example is designed such that when the overlapped region 31 exists in plural, respective colors of the overlapped regions 31 change depending on an increase or a decrease in the number of regions 31. While this Example is set to be able to display the overlapped regions 31 in a quadruplex way (i.e., four colors), the number of regions 31 is not limited to four. For example, the color of some overlapped regions 31 may be just changed to a different color. Thus, the displayed colors are not necessarily required to be changed depending on an increase or a decrease in the number of regions 31.

By displaying the overlapped regions 31 in different colors as described above, the user can visually recognize the displayed image with more ease. Such a scheme is useful in regardless of whether the case where the regions are not to be overlapped with each other, or the case where the regions are to be intentionally overlapped with each other. Thus, since anomalous points, such as an overlap between the movement paths and an overlap between the movement path and a member placed on the work object, can be displayed on the screen for visual confirmation, the work for creating the operation program can be performed in a shorter time.

(ii) Calibration of Lens Aberrations

Figure 9A:
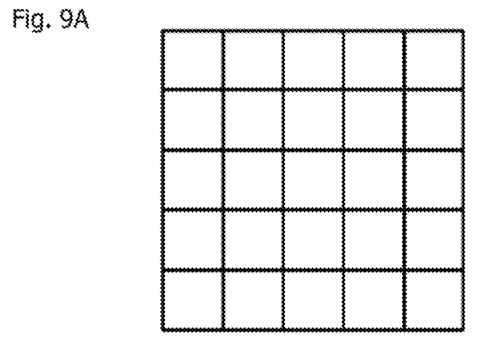
FIG. 9(a) illustrates an original image.
Figure 9B:
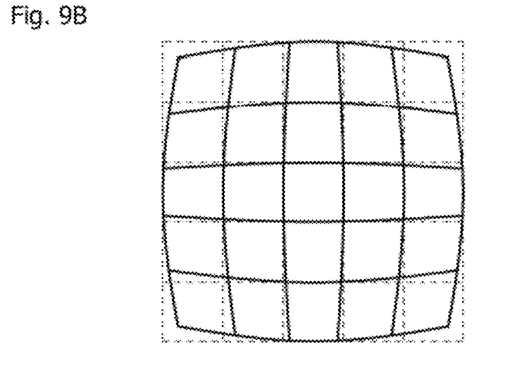
FIG. 9(b) illustrates a barrel type aberration.
Figure 9C:
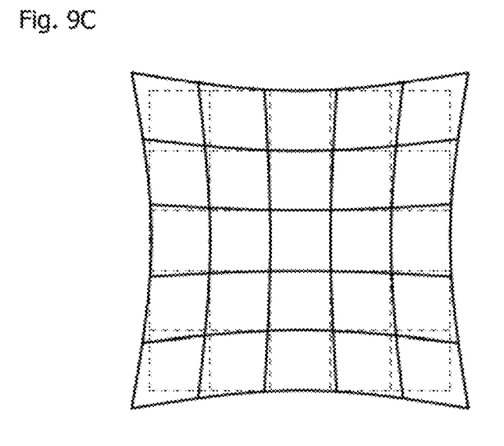
FIG. 9(c) illustrates a bobbin type aberration.

The taken-in workpiece image contains aberrations attributable to a lens of the camera, which is used to capture the workpiece image, with varying degrees. The term "aberration" implies a phenomenon that light emitted from one point is neither precisely converged to one point nor focused to form an in-focus image after passing through a lens, a mirror, or the like. There are several types of aberrations. Among the aberrations, the so-called distortion aberration is most problematic in an image for which accurate dimensions are to be reproduced. The term "distortion aberration" implies a phenomenon that an image is distorted and deformed instead of being blurred. The distortion aberration is categorized to the barrel type (FIG. 9(b)) in which an image is contracted to a larger extent toward the periphery of the image, and the bobbin type (FIG. 9(c)) in which an image is expanded to a larger extent toward the periphery of the image. When the operation program is created based on an image captured through a lens having the above-described distortion aberration, a deviation of several millimeters may be caused in the worst case. To cope with such a problem, the distortion aberration is calibrated.

This Example employs the known calibration method based on the Brown's aberration model. The Brown's aberration model is a model including a distortion in the circumferential direction and a distortion in the tangential direction, and is formulated based on the correspondent relationship between an image point with a distortion and an image point with no distortion, taking into account the relation with respect to an optical center. The calibration is performed by adjusting the coefficients in the model formula.

Furthermore, an image of a substrate for calibration is used to perform the calibration. The substrate for calibration is a thin plate in which many holes are bored in a matrix pattern at certain intervals in the vertical and horizontal directions. Preferably, the numbers of holes in the vertical and horizontal directions are equal to each other, and the substrate for calibration has a square shape.

Because the extent of the distortion aberration changes with replacement of a lens, the calibration is executed at the time when the lens is replaced, or when the camera including the lens is replaced.

One example of calibration procedures will be described below.

First, an image of the substrate for calibration is prepared and taken in with the function of the automatically generating program. Next, calibration values (coefficients based on the above-mentioned model) are input, and the calibration is executed. Next, a linear line is drawn on the screen with the calibrated image of the substrate for calibration being displayed as a background, and it is compared with the array of the holes in the calibrated image. If the drawn linear line and the array of the holes are aligned with each other, the calibration is ended. If they are not aligned with each other, the calibration and the confirmation are repeated by inputting new calibration values.

While the inputting of numerical values and the confirmation are manually performed in the above-described example, they may be automated.

Because the distortion aberration is caused even when an image is captured in a direction perpendicular to the working surface, the above-described calibration is effective in not only the case like this Example, but also in the cases disclosed in the above-cited Patent Documents 1 and 2.

As described above, since the distortion of the image caused by the lens aberrations are calibrated, the accurate operation program can be created based on the image free from distortion. Moreover, since the aberrations can be calibrated, it is possible to employ image data captured using various devices regardless of the type of camera, or regardless of the type of lens.

INDUSTRIAL APPLICABILITY

The present invention can be applied to not only the above-described case of applying the liquid material to the printed circuit board, but also to other kinds of work, including mechanical working such as cutting, welding, etc., assembly such as bonding, fastening of screws, etc., and inspections in which observation and measurement are carried out using a camera, a laser, etc.

LIST OF REFERENCE SYMBOLS

1: substrate (workpiece) 2: image data input device (camera) 3: frame line (shape reference line) 4: substrate image 5: operating screen 6: movement path 7: cursor 8: application apparatus 9: ejection device 10: driving mechanism 11: operation program creating device 12: reservoir 13: nozzle 14: tube 15: dispense controller 16: communication cable 17: X driving mechanism 18: Y driving mechanism 19: Z driving mechanism 20: X moving direction 21: Y moving direction 22: Z moving direction 23: table 24: robot controller 25: input device (mouse, keyboard) 26: storage device 27: display device 28: processor 29: transfer cable 30: line region having width 31: overlapped region

The invention claimed is:

1. A non-transitory a computer-readable storage medium comprising instructions stored thereon for automatically generating an operation program, which causes a work head to move relative to a work object and to carry out desired work, that when executed on a processor, perform the steps of:

a first step of displaying a reference data input window which allows input of shape data of the work object or a work region on a display device;

a second step of taking in image data of the work object or the work region, the image data being captured by an image data input device;

a third step of compensating for distortion in the image data taken-in from the image data input device, the distortion attributable to arrangement of the image data input device, based on the input shape data of the work object or the work region;

a fourth step of displaying a movement path input window which allows designation of a movement path with the compensated image data displayed as a background; and a fifth step of automatically generating the operation program based on the movement path that is designated on the movement path input window, wherein, in the third step, a shape reference line, having a shape substantially the same as the shape of the work object or the work region, is prepared and displayed on the display device together with the work object or the work region, distortion in the image data attributable to arrangement of the image data input device is compensated for based on the input shape data by deforming the shape reference line to conform with an external shape of the work object or the work region on the display device.

2. The non-transitory computer-readable medium according to claim 1, wherein, in the first step, the reference data input window allows input of reference coordinates of the work head.

3. An operation program creating device comprising non-transitory computer-readable medium according to claim 2, an input device, a display device, and a processor.

4. The non-transitory computer-readable medium according to claim 1, wherein the work object or the work region has a square shape, and the shape reference line has a square shape.

5. The non-transitory computer-readable medium according to claim 4, wherein, in the third step, corners of the work object or the work region are automatically detected, and the corners of the work object or the work region are automatically aligned with corresponding corners of the shape reference line in superimposed relation.

6. The non-transitory computer-readable medium according to claim 5, wherein, in the third step, the distortion in the image data attributable to the arrangement of the image data input device is compensated for by rearranging individual pixels in the work object or the work region, which is designated by the shape reference line, through coordinate transform using a geometrical transform technique such that the shape reference line has a square shape in conformity with the input shape data.

7. The non-transitory computer-readable medium according to claim 4, wherein, in the third step, the distortion in the image data attributable to the arrangement of the image data input device is compensated for by rearranging individual pixels in the work object or the work region, which is designated by the shape reference line, through coordinate transform using a geometrical transform technique such that the shape reference line has a square shape in conformity with the input shape data.

8. The non-transitory computer-readable medium according to claim 1, wherein, in the fourth step, the designated movement path is displayed in real time on the window in accordance with a preset width value.

9. The non-transitory computer-readable medium according to claim 1, wherein, in the fourth step, when an anomalous point is present in the designated movement path, the movement path is displayed in real time on the window with the anomalous point displayed in a different color.

10. The non-transitory computer-readable medium according to claim 1, further comprising a step of taking in image data of a substrate for calibration, and compensating for aberrations of a lens based on input calibration values.

11. An operation program creating device comprising non-transitory computer-readable medium according to claim 1, an input device, a display device, and a processor.

12. The non-transitory computer-readable storage medium according to claim 1, wherein the work object is a substrate.

13. A working apparatus comprising a work head, a holder for holding a work object, a driver to move the work head and the holder relative to each other, a reading device, a display device, an input device, and a control unit, the working apparatus carrying out desired work while the work head is moved relative to the work object based on image data of the work object or a work region, the image data being taken in from the reading device,
wherein the image data of the work object or the work region is obtained by capturing image data of the work object or the work region with an image data input device, and
the control unit is configured to execute:
a step of compensating for distortion in the image data of the work object or the work region data based on the input shape data of the work object or the work region, the distortion including an inclination of an image attributable to arrangement of the image data input device and the image data being taken in from the reading device, based on shape data of the work object or the work region, the shape data being input through the input device,
a step of displaying, on the display device, a movement path input window which allows designation of a movement path with respect to the compensated image data displayed as a background, and
a step of automatically generating an operation program based on the movement path that is designated on the movement path input window,
wherein, in the step of compensating, a shape reference line having a shape substantially the same as a shape of the work object or the work region, is prepared and displayed on the display device together with the work object or the work region, distortion in the image data attributable to arrangement of the image data input device is compensated for based on the input shape data by deforming the shape reference line to conform with an external shape of the work object or the work region on the display device.

14. The working apparatus according to claim 13, wherein the control unit automatically creates the operation program based on reference coordinates of the work head, the reference coordinates being input through the input device.

15. The working apparatus according to claim 13, wherein the work object or the work region has a square shape, and the shape reference line has a square shape.

16. The working apparatus according to claim 15, wherein the control unit has a function of automatically detecting corners of the work object or the work region, and automatically aligning the corners of the work object or the work region with corresponding corners of the shape reference line in superimposed relation.

17. The working apparatus according to claim 16, wherein, with the function of compensating for the distortion in the image data attributable to the arrangement of the image data input device, the control unit compensates for the distortion in the image data attributable to the arrangement of the image data input device by rearranging individual pixels in the work object or the work region, which is designated by the shape reference line, through coordinate transform using a geometrical transform technique such that the shape reference line has a square shape in conformity with the input shape data.

18. The working apparatus according to claim 15, wherein, with the function of compensating for the distortion in the image data attributable to the arrangement of the image data input device, the control unit compensates for the distortion in the image data attributable to the arrangement of the image data input device by rearranging individual pixels in the work object or the work region, which is designated by the shape reference line, through coordinate transform using a geometrical transform technique such that the shape reference line has a square shape in conformity with the input shape data.

19. The working apparatus according to claim 13, wherein the work head is an ejection device for ejecting a liquid material.

20. The working apparatus according to claim 13, wherein the work object is a substrate.

* * * * *